No. 694,760. Patented Mar. 4, 1902.
G. C. LATHROP.
DRIP, GRIT, AND FEED DEVICE FOR POULTRY.
(Application filed July 16, 1901.)
(No Model.)
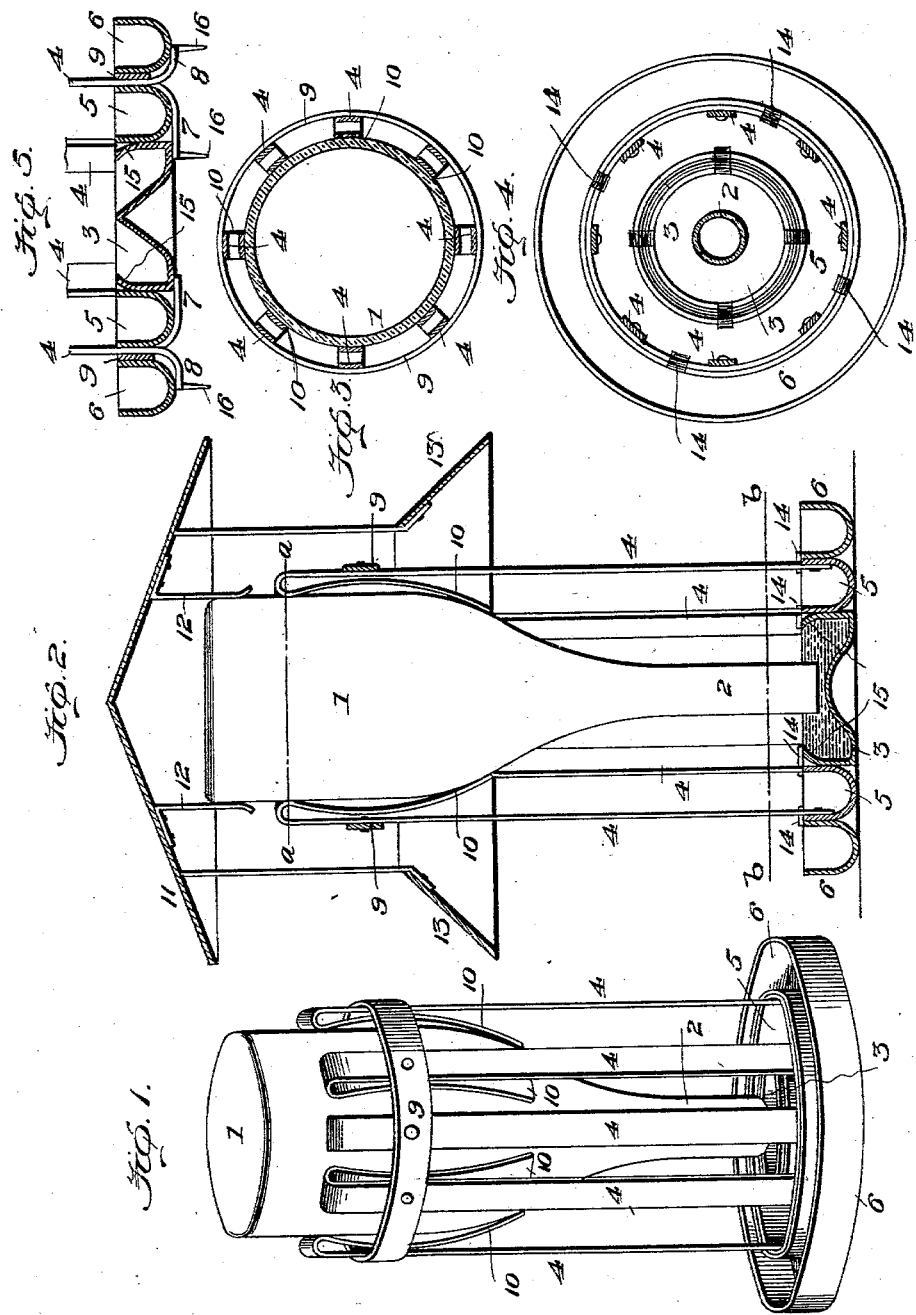

UNITED STATES PATENT OFFICE.

GEORGE CHARLES LATHROP, OF WASHINGTON, DISTRICT OF COLUMBIA.

DRIP, GRIT, AND FEED DEVICE FOR POULTRY.

SPECIFICATION forming part of Letters Patent No. 694,760, dated March 4, 1902.

Application filed July 16, 1901. Serial No. 68,472. (No model.)

*To all whom it may concern:*

Be it known that I, GEORGE CHARLES LATHROP, a citizen of the United States, residing at the city of Washington, in the District of Columbia, have invented certain new and useful Improvements in Drip, Grit, and Feed Devices for Poultry, of which the following is a specification.

My invention is directed to the production of a plurality of endless troughs and a central basin for containing grit and food and water for poultry and an open stand or rack whereby these devices are inclosed; and the features wherein my invention resides will be pointed out in the claims appended hereto in connection with the accompanying drawings, in which—

Figure 1 shows in perspective a stand-rack and trough device embodying my improvements for watering and feeding poultry. Fig. 2 is a vertical section of the same. Fig. 3 is a horizontal section of the water supplying and suspending device on the line $a\,a$ of Fig. 2. Fig. 4 is a horizontal section showing in top view the water and food containing trough device on the line $b\,b$ of Fig. 2. Fig. 5 shows a vertical section of the means of freely seating the watering and feeding device upon the supporting rack-stand of the water-supplying receptacle.

The water and feed device comprises a suspension-frame for a water-drip and a watering and feeding base device concentric with the drip. The drip is preferably formed of an inverted bottle 1, suspended with its neck 2 centrally overhanging a pan or basin 3. The mouth of the drip-receptacle stands a little below the level of the rim of the pan or basin, so that the falling of the water within the basin unseals the mouth of the bottle and permits the outflow of the water therefrom to keep the basin up to the water-sealing line. The device for suspending and supporting the drip consists of a vertical skeleton rack-frame formed of vertical strips or rods 4, preferably of sheet metal, forming a sort of rack, the space between the strips being sufficiently wide to permit the poultry to freely reach their heads inward between them to the water-basin. Concentric with the latter and joining its vertical walls is a trough 5 for containing grit, and a trough 6 for containing food joins the outer wall of the grit-trough. I prefer to form the seats for the concentric troughs and for the central water-pan by splitting the ends of the rack-strips, Fig. 5, and spreading the split parts in opposite directions, one part 7 standing inward under the grit-trough and under the water-basin, the other part 8 standing outward under the outer soft-food trough. For this purpose the split ends of the frame strips or rods stand between the walls of the grit and food troughs, and the vertical strips are held in proper relation by ring bands 9, riveted around their lower and upper ends, as in Figs. 1 and 5, so as to form a rigid skeleton structure forming a flat base-support.

The surrounding of the water-basin by the food-troughs is an advantageous construction for keeping the feed-water clean, as the heads of the fowls must reach between the vertical frame-strips to drink from the central basin.

In Fig. 2 I have shown the lower ends of the frame-strips as riveted to the vertical walls of the grit-trough 5, and in this construction the central basin and the outer concentric food-trough may rest on the ground when the device is in use; but looking at Fig. 5 it will be seen that the feed-troughs and the basin are seated concentrically upon the divided ends 7 8 of the frame-strips, and which I deem the preferred construction.

As a means of suspending the drip device by and within the open housing or rack the upper ends of the housing parts are preferably bent or doubled over and downward, so as to form inside spring-grips 10, which are caused to press with a binding force upon the inverted shoulder part of the water-containing receptacle and hold it with its nozzle at the proper depth in the drinking-pan.

A hood 11 may surmount the drip-bottle and be supported upon it by spring-clips 12 to protect the bottle from the direct rays of the sun while a supplement shield 13 depending from the hood serves to give shade to the food-troughs.

Referring to Figs. 2 and 4, obviously the outer food-trough and the central basin may be provided with lips 14, which overhang, so as to rest upon the edges of the grit or inner trough, which latter being riveted to the frame-strips can be lifted as an entirety, the same as the trough parts seated on the frame-strips, as in Fig. 5.

I have described and shown two food-troughs surrounding the central basin; but obviously a greater number of concentric troughs may be used for different kinds of foods.

It will be understood that grit is as much a necessity as food is for poultry and that it is essential that the grit should always be before them. Hence the arrangement of the grit-trough next to the water-supply is natural to the instinct of the fowl, and the arrangement of the drink, the grit, and the food on the same plane and their relation to each other causes the fowl in reaching for one to cross the other.

In Fig. 2 the inward overhanging edge of the basin-rim 15 is important in serving as a scraper to wipe or scrape off the food from the fowls' bills and cause it to be deposited in the basin and washed under the overhanging rim by the next flow of the water from the drip and out of the reach of the chicken drinking. This provision for causing the food which may collect in the basin to settle under the overhanging brim is important in keeping the drinking-water clean at the level of the rim.

As cleanliness is of the last importance in poultry culture, the troughs are designed for separate removal and cleaning, and their semicircular form greatly conduces to this, and particularly in the use of soft food in the outer trough, the walls of which are easily cleaned.

It is considered good practice to feed soft food in the forenoon, because the chicken's craw contains less food in the morning and soft food is more easily then digested. This has the effect to cause the chickens to run about in seeking more food. In supplying this want I find it convenient to convert the automatic water-supply device into an automatic seed-feeder. While therefore the water-drip is used in feeders at different places for the poultry, the drip of other feeders being supplied with seed will attract the fowls causing them to go around the device and picking the seed from the basin thereby cause it to be automatically fed from the bottle into the basin and to be controlled in the same manner as the water-drip.

It must be apparent that instead of throwing the food upon the ground, where it is picked up with dirt by the scramble of the chickens, it is fed to them without confusion and with exercise in traveling around an orderly and cleanly kept table supplying every necessity for the cleanliness and health of the fowls.

In Fig. 5 I have shown the feeding-troughs as being supported by the split ends of the strip-stand, and it will be understood that a tripod can be thus made of the stand to give it a proper support. As a means of reinforcing this tripod function the branch arms may terminate in prongs or holding-spikes 16, which, being pressed into the ground by weight upon the frame, serve to anchor the stand into the ground.

Referring to the grip for holding the drip in proper position, it will be noted that the return ends of the frame-strips give the proper gripping force upon the shoulders of the bottle to hold it central and to coöperate with the top ring-band to give the desired rigidity to the stand, because it is both braced and anchored at the bottom.

I have stated that the central water-basin can be used to automatically feed seed, and it is important to note that for this purpose the basin can be reversed to present its concave bottom as a better receptacle for the seed.

I have stated that the stand device is constructed of metal slats and binding-hoops; but obviously such device constructed of wire or of wood properly shaped, bound, and connected will form the fender-housing and support for the drip and a support for the feeding and watering device.

Preferably the stand strips or rods rise from the inner trough to leave the outer trough for the soft food unobstructed.

I claim—

1. A feeding and watering device for poultry consisting of a plurality of contiguous concentric troughs, a basin within the circle of the inner trough, an open or skeleton stand of strips or rods, bands encircling and fastening their upper and lower ends together, the basin and the troughs being freely seated upon the lower ends of the strips, whereby the basin and the troughs are rendered independently removable for cleaning, and a drip suspended over the basin.

2. A feeding and watering device for poultry consisting of a basin and a plurality of contiguous concentric troughs, an open or skeleton stand of strips, and means whereby the basin and troughs are connected to and carried by the stand for independent removal therefrom.

3. In a feeding and watering device for poultry, the combination with a plurality of concentric troughs for containing food, a basin for containing water central with the troughs, a skeleton rack or stand of strips or rods having their lower ends split the branches whereof turned inward and outward to form seats for the troughs and basin, and means supported within the rack or stand for supplying water to the basin.

4. A feeding and watering device for poultry consisting of a basin, a plurality of endless troughs surrounding the basin, and a skeleton rack or stand of strips or rods having their lower ends split or divided to form seats for the troughs and for the basin and terminating in spear or anchor points whereby to anchor the device.

In testimony whereof I affix my signature in presence of two witnesses.

GEORGE CHARLES LATHROP.

Witnesses:
A. ROLAND JOHNSON,
GUY H. JOHNSON.